UNITED STATES PATENT OFFICE.

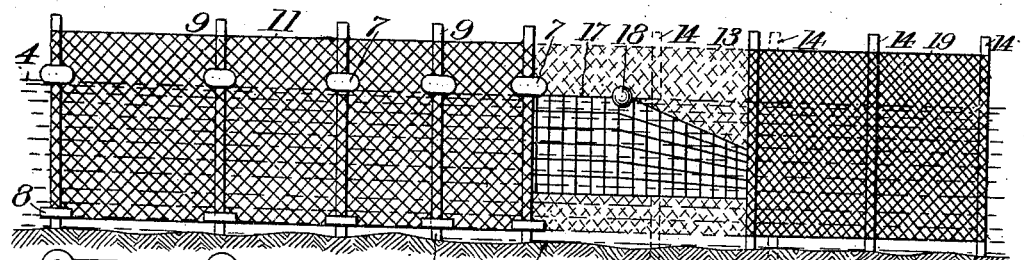

CHARLES F. PIKE, OF PHILADELPHIA, PENNSYLVANIA.

TRAP FOR CATCHING PORPOISES.

972,229.  Specification of Letters Patent.  Patented Oct. 11, 1910.

Application filed September 11, 1909. Serial No. 517,249.

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Catching Porpoises, (Case F,) of which the following is a specification.

My invention relates to devices for catching fish and especially for catching the porpoise.

In this art as heretofore developed means have been provided for this purpose which comprise in general terms obstructions, such as nets or seines, placed in the path traveled by the fish, and in the rear thereof receptacles with forward openings coinciding with openings in the obstructions, whereby the fish upon encountering the obstruction will pass through the opening therein into the receptacle in the rear thereof.

The porpoise generally swim near the surface of the water and while they will to some extent pass through the opening in the obstruction placed in their path, they will be very liable, when they meet an obstruction, to jump over it and thus be lost to the fisher.

The general object of my invention is to provide means whereby the fish will be caught either after jumping over the obstruction or passing through the opening and thus the loss of such a large number as would occur in the use of the means now provided is avoided.

The specific object of my invention is to provide improved means for accomplishing these results, and with this object in view, my invention consists in the improved construction, arrangement and combination of parts hereinafter fully described and afterward specifically claimed.

I have illustrated an embodiment of my invention in the accompanying drawing, in which—

Figure 1 is a side elevation with parts in dotted outline. Fig. 2, a plan view, and Fig. 3, a front elevation.

Referring specifically to the drawing, 4 indicates the surface and 5 the bottom of a body of water in which the apparatus is to be located.

6 indicates an obstruction, in this instance shown as an ordinary seine, and provided, if desired, with the usual floats and sinkers, the floats in this instance being shown as buoyant rings 7, and weighted rings 8 adapted to slide on poles 9 by means of which the obstruction is fixed in position and allowed at the same time to rise and fall with the tide. At low tide, as shown in Fig. 1, the obstruction is fully extended vertically, but as the tide rises, that part above the rings 7 is folded or puckered up, the upper edge being secured to the poles. These poles may be arranged in any desired manner either straight across the path of the fish or curved as shown at 10 and 11 in Fig. 2 to guide the fish toward the center of the obstruction.

The obstruction extends a sufficient distance above the surface of the water to prevent the porpoise from jumping over it, except at 12, where the upper edge of the obstruction is at the surface of the water and in the rear of this portion 12 is located a pound 13 constructed, as ordinarily, of poles 14 and netting sides and rear end 15 extending a sufficient distance above the surface of the water to prevent the porpoise jumping out of it, the front wall which would be in contact with the obstruction being omitted, as unnecessary.

At 16, at which point the obstruction is extended above the water as before described, there is an opening from which a guide 17, of any suitable shape, and supported at 18 by floats if desired, communicates with a pound 19 of the same general construction as the pound 15, having supporting poles 14 and sides 15 of netting extending above the water, the front wall in this instance, being not omitted.

The porpoise entering between the parts 10 and 11 of the obstruction will reach either the part 12 or the part 16 and will be liable to either jump over the part 12 or to dive under and through the opening.

Those jumping over the part 12 of the obstruction will fall directly into the pound 15, while those diving will pass through the opening 16 and guide 17 into the pound 19.

Should a school of porpoise approach between the sides 10 and 11 of the obstruction, these parts may be detached from the poles and thrown into the position indicated in dotted lines at 100 and 110, the ends being either closed together, or left open and the front space obstructed by a boat. This will cause the school to advance toward the parts 12 and 16 and to jump over at one or dive under at the other, as before described, passing respectively into one of the pounds, 15 or 19.

It will be obvious to those skilled in the art that the construction of the various parts of this apparatus, such as the pounds, the obstruction, and the guide 17, may be greatly varied without departing from the spirit and scope of my invention.

Having described my invention, what I claim as new, and desire to secure by Letters Patent, is—

1. An apparatus of the character described, comprising an obstruction in the path of travel of the fish extending above and below the surface of the water, a pound in the rear of the obstruction, that part of the obstruction above the water being removed at the point in front of the pound, and an opening being provided at another point below the water, a tubular guide connected around said opening to the rear side of the obstruction, and a pound located in the rear of and communicating with said guide, substantially as described.

2. An apparatus of the character described, comprising an obstruction in the path of travel of the fish extending above and below the surface of the water, secured against lateral or longitudinal displacement, but permitted to rise and fall with the tide, and provided with an opening below the surface of the water, in combination with a rigidly fixed pound in the rear of and separated from the obstruction having an opening in its front wall, and a flexible tubular guide extending from the rear side of the obstruction to the front wall of the pound and connecting the opening in the pound with that in the obstruction, substantially as described.

3. An apparatus of the character described, comprising poles planted in the water and extending above the surface thereof, an obstruction extending above and below the surface of the water, buoyant rings slidable on the poles and connected to the top of the obstruction, weighted rings slidable on the poles and connected to the bottom of the obstruction, and a pound in the rear of the obstruction, substantially as described.

4. An apparatus of the character described, comprising poles planted in the water and extending above the surface thereof, an obstruction extending above and below the surface of the water, floats slidable on the poles to which the obstruction is attached, a pound in the rear of the obstruction, that portion of the obstruction which connects with the pound terminating upwardly at the surface of the water, substantially as described.

5. An apparatus of the character described, comprising poles planted in the water and extending above the surface thereof, an obstruction extending above and below the surface of the water, floats slidable on the poles to which the obstruction is attached, a pound in the rear of the obstruction, the obstruction at this point being provided with an opening below the surface of the water, and a tubular passage leading from this opening in the obstruction to the pound, the obstruction being constructed in the form of spreading curved wings forming guides toward that portion behind which the pound is located, substantially as described.

In testimony whereof I affix my signature in presence of two witnesses.

CHARLES F. PIKE.

Witnesses:
Wm. A. Pike,
John Devlin.